United States Patent [19]

Vesnic

[11] 4,090,172
[45] May 16, 1978

[54] WARNING DEVICE FOR TIRE PRESSURE ANOMALIES

[76] Inventor: Borislav Vesnic, 50 rue du grain d'anis, Villeneuve sur Yonne, France, 89500

[21] Appl. No.: 601,523

[22] Filed: Aug. 4, 1975

[51] Int. Cl.² .......................................... B60C 23/04
[52] U.S. Cl. .................................. 340/58; 73/146.5; 200/61.25; 325/117; 343/712
[58] Field of Search ............ 340/58; 200/61.22, 61.25, 200/61.26; 73/146.3, 146.5, 146.8; 325/113, 117; 179/2; 343/712, 711, 713, 878

[56] References Cited

U.S. PATENT DOCUMENTS

| | | | |
|---|---|---|---|
| 1,019,557 | 3/1912 | Terpening | 200/61.25 |
| 1,984,084 | 12/1934 | Rodney | 200/61.26 |
| 2,727,221 | 12/1955 | Sprigg | 340/58 |
| 2,859,441 | 11/1958 | Rosenbaum | 343/712 |
| 2,860,321 | 11/1958 | Strickland et al. | 340/58 |
| 3,178,686 | 4/1965 | Mills | 340/58 |
| 3,215,978 | 11/1965 | Brown et al. | 340/58 |
| 3,538,271 | 11/1970 | Mirsky | 340/58 |
| 3,693,149 | 9/1972 | Johnston | 340/58 |
| 3,746,857 | 7/1973 | Hoyler et al. | 179/82 |
| 3,786,413 | 1/1974 | Ross et al. | 340/58 |
| 3,805,229 | 4/1974 | Murphy | 340/58 |

Primary Examiner—John W. Caldwell, Sr.
Assistant Examiner—Joseph E. Nowicki
Attorney, Agent, or Firm—Lane, Aitken, Dunner & Ziems

[57] ABSTRACT

A warning device for tire pressure anomalies in which the valve of the tire to be monitored is connected to a pressure variation sensor which has two pressure thresholds, one for insufficient pressure, the other for excess pressure. When one of the thresholds is reached, the sensor closes an alarm circuit connected to an electronic signalling circuit on a printed circuit fixed on a sealed casing that is rigidly connected to the frame of the wheel and which contains two batteries that supply the signal transmission circuit. The data delivered by the signalling circuit is sensed by a detector that supplies a series of frequency selectors that discriminate the tire for which a warning is given for excess or low pressure. In the case of a pressure anomaly, the frequency severally command a relay that energizes a signal light and triggers an acoustic signal.

12 Claims, 8 Drawing Figures

U.S.Patent May 16, 1978 Sheet 1 of 3 4,090,172
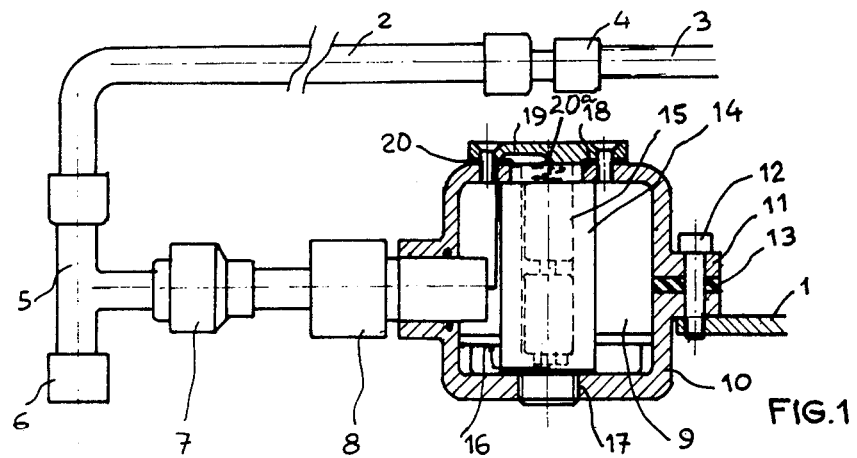
FIG.1
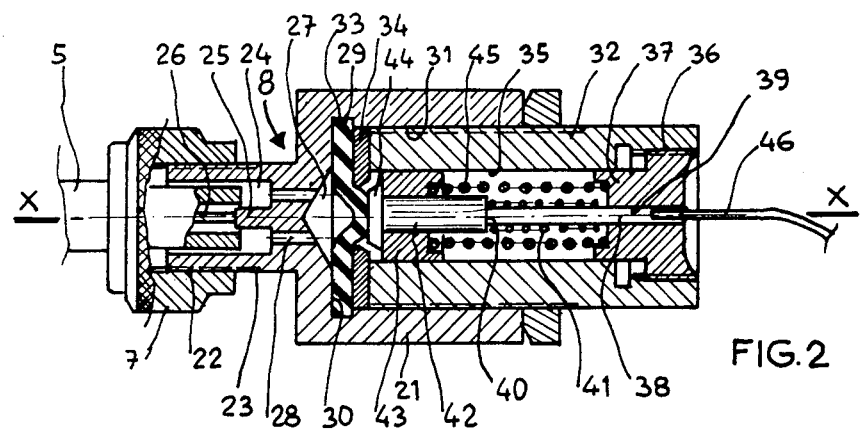
FIG.2
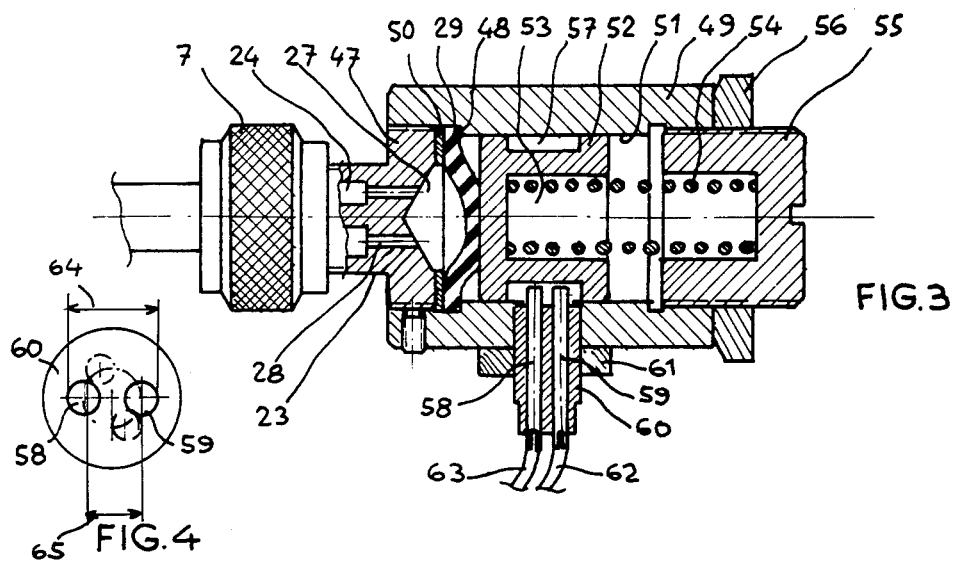
FIG.3
FIG.4

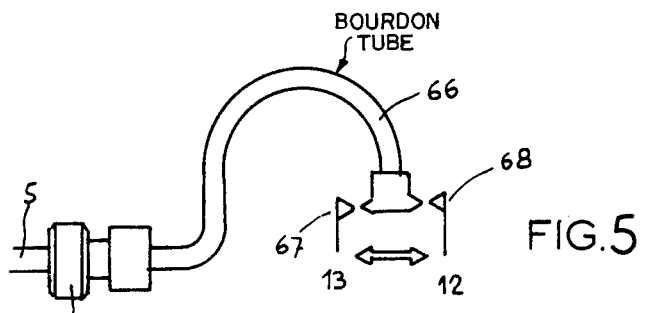
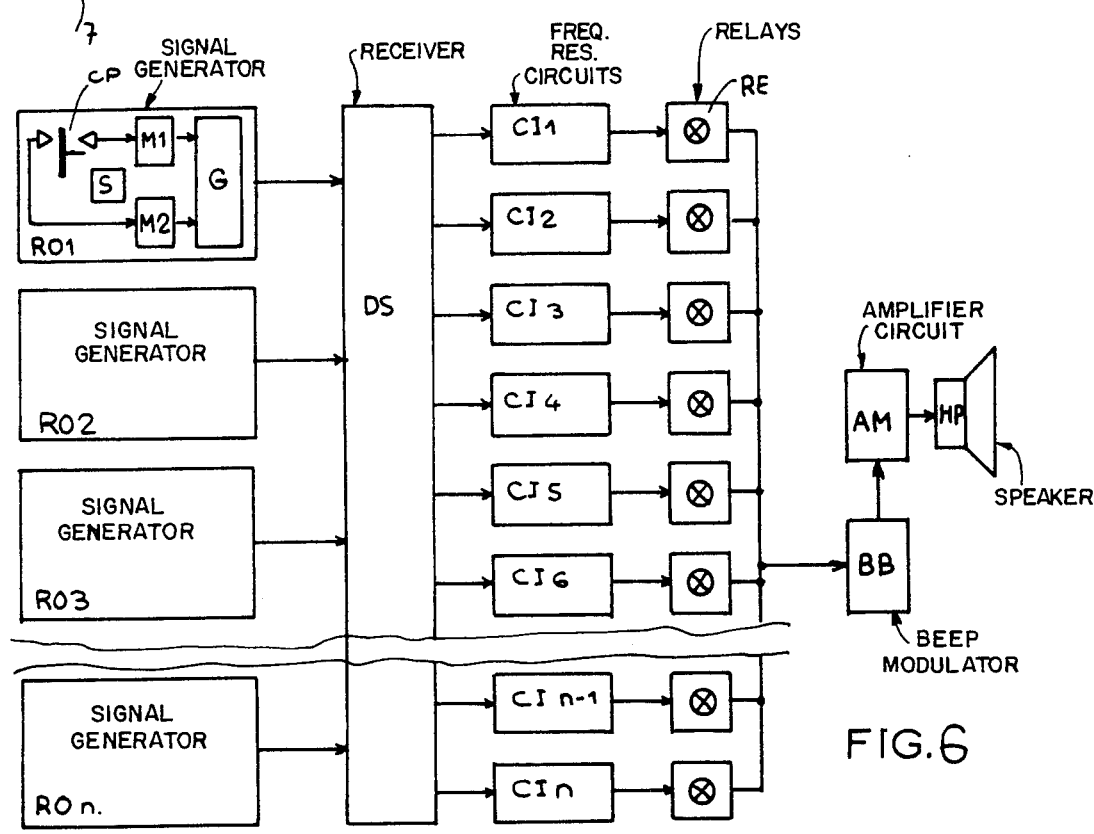
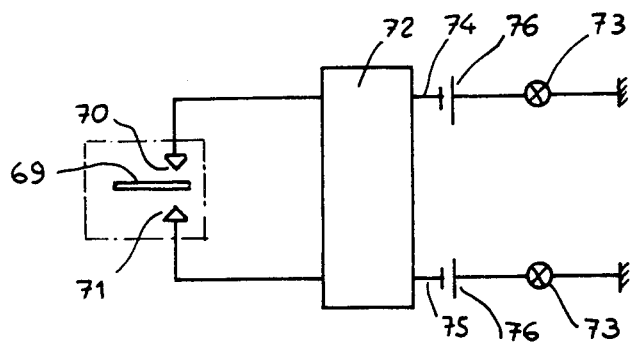

WARNING DEVICE FOR TIRE PRESSURE ANOMALIES

BACKGROUND OF THE INVENTION

The invention relates to a warning device that indicates to the driver of a tire-equipped vehicle when the air pressure of one or more of the tires is too high or too low.

Rapid travel of a vehicle equipped with tires can produce significant excess tire pressure from heating due to ambient temperature, and to the quality of the road pavement and the gradient of the road, especially in mountains where prolonged use of brakes heats the brake drums and transmits supplementary heat to the tires. These factors can result in an increase of internal tire pressure to the extent that the tire can rupture and create a driving hazard. Also, if the vehicle brakes lock because of abnormal heating or because of some kind of breakdown, the transfer of heat to the tires is even more significant, which further increases the danger of tire rupture.

Many of the known warning devices for tire pressure anomalies are only sensitive to low pressure, and in view of the foregoing, are thus quite inadequate to ensure complete vehicle safety.

SUMMARY OF THE INVENTION

It is therefore an object of the present invention to provide a warning device for vehicle tire pressure variations, which provides an indication when a tire pressure is too low or too high with respect to a reference pressure defined by a lower threshold and an upper threshold, the value of which depends upon the vehicle type and the maximum load.

Towards the fulfillment of this and other objects, the device of the present invention comprises a sensor disposed in a cooperative relation to the tire and adapted to generate an output in response to the inflation pressure of the tire falling out of the range, alarm means associated with the dashboard of the vehicle and adapted to provide the signal, and an electrical circuit connected between the sensor and the alarm means for actuating the alarm means in response to the generation of the output.

According to a first embodiment of the invention, the general warning information is sensed by an electronic device that transmits it to the vehicle dashboard on a visual display which may or may not be accompanied by an acoustic alarm. Transmission of the warning information is effected through the vehicle frame, by means of a signal in the form of a carrier frequency which may or may not be modulated.

According to a second embodiment of the invention, the alarm information is differentiated for each tire, by means of a sensor that has a frequency selector device. Each wheel has a different assigned frequency, and the dashboard signal has means for a general luminous or an acoustic alarm, and means that show the state of each tire and whether it has too high a pressure, or too low a pressure.

According to a third embodiment of the invention, transmission of the alarm information to the vehicle dashboard is effected by electric conductors.

BRIEF DESCRIPTION OF THE DRAWINGS

Other characteristics and advantages of the present invention will be better understood upon reading the following specification, with reference to the attached drawings, where:

FIG. 1 is a partial elevational, partial sectional view of the general arrangement of the warning device of the present invention;

FIG. 2 is a sectional view of the pressure-variation sensor used in the warning device of FIG. 1;

FIG. 3 is a variant of the pressure-variation sensor of FIG. 2;

FIG. 4 is an enlarged elevational view of a component of the sensor of FIG. 3;

FIG. 5 is a schematic representation of another variant of the pressure-variation sensor of FIG. 2;

FIG. 6 is a block diagram of the warning device of the present invention;

FIG. 8 is a schematic view of a variation of a pressure checking device used in the warning device of the present invention.

DESCRIPTION OF THE PREFERRED EMBODIMENTS

Figure 7:
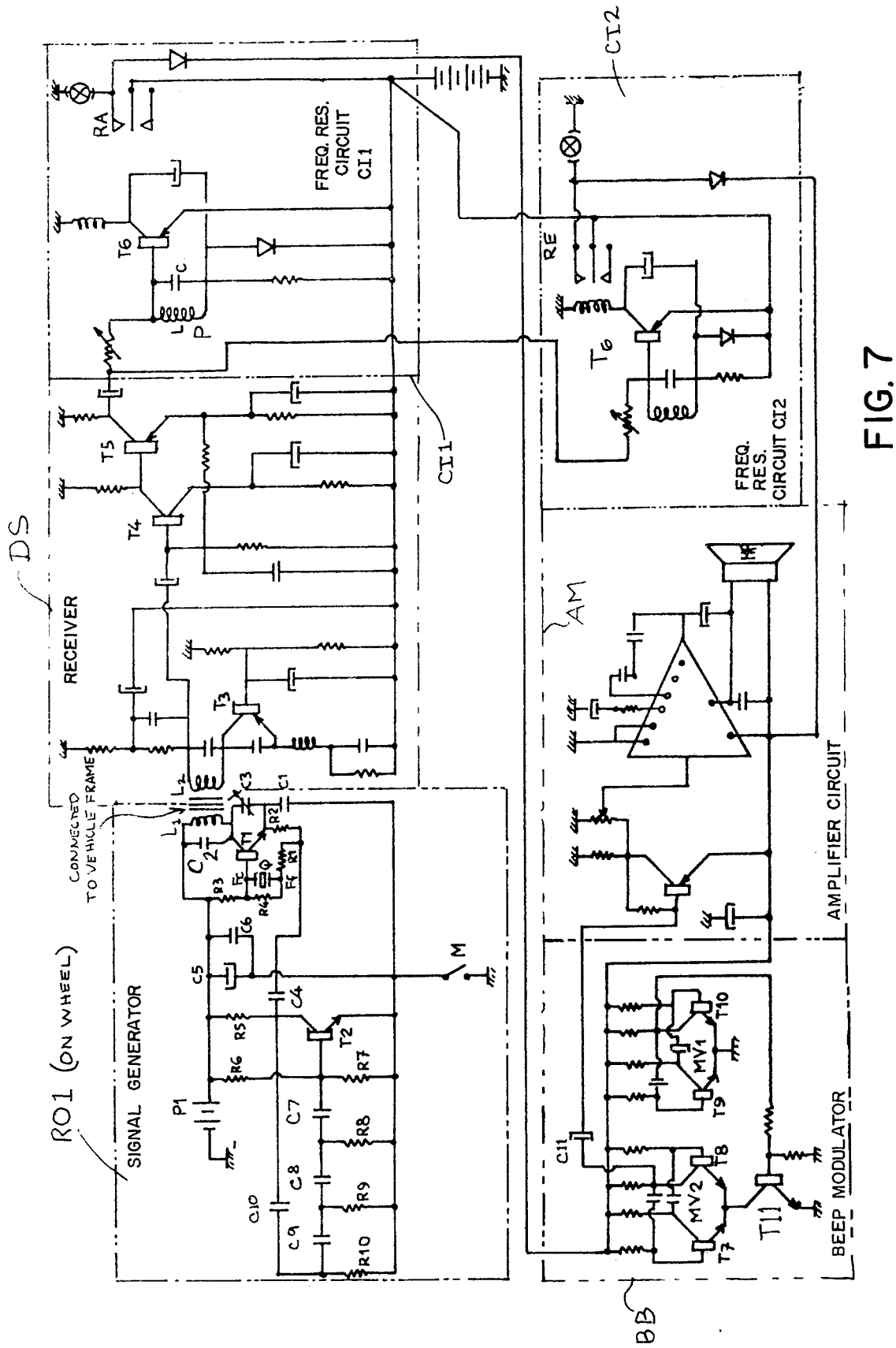
FIG. 7 is a schematic view of the electronic circuitry of the warning device of the present invention.

As represented in FIG. 1, the warning device of the present invention is located relative to the vehicle wheel 1 and comprises a flexible tube 2 fixed at one end on valve 3 of the wheel by a tip 4 that opens the valve, and at the other end to a tee connection 5. The tee connection 5 has an inflating orifice 6, a tightening nut 7, and a pressure-variation sensor 8 extending in a casing 9 which is formed by two portions 10 and 11 joined together and fixed by bolts 12 after interposition of a gasket 13. Casing 9 encloses a supplementary case 14 which contains dry-cell batteries 15 that supply electrical energy to the electronic circuit for transmission of a warning signal. The latter circuit is mounted on a printed circuit 16 disposed on case 14 which is bolted at 17 onto casing 9 and centered by a recess 18 of said casing. A cover 19 is bolted onto casing 9 after interposition of a gasket 20 and encloses case 14. A spring 20a extends between case 14 and cover 19 and forms the electric contact and ensures electric contact pressure of the batteries.

The details of the sensor 8 are shown in FIG. 2. In particular, the sensor comprises a socket 21 screwed into nut 7 by a threaded portion 22 of a shoulder 23 of socket 21. A pressure chamber 24 is defined within the socket 21 and a central stud 25 is disposed in the chamber and opens the tire valve orifice by thrusting back rod 26 of the valve that is enclosed in the tee connection 5 (FIG. 1). Another chamber 27 is defined by socket 21 and communicates with the pressure chamber 24 by at least one hole 28. The air pressure is then applied against an elastic membrane 29, made of rubber, for example, disposed on the bottom of a seat that ends in a flat inner surface 30 extending perpendicular to longitudinal axis X—X. Socket 21 has a threaded portion 31 on which is engaged a sleeve 32 that holds membrane 29 centered in clearance 33 between the socket 21 and the sleeve 32 after interposition of a metallic gasket 34. Sleeve 32 has a recess 35 terminating in a threaded portion 36 in which is screwed a metallic plug 37 centered in recess 35 and guiding a rod 38 which is electrically insulated with respect to plug 37 and which slides in a recess 39 formed in plug 37. The rod 38 has a shoulder 40 to serve as a bearing for a compression spring 41. An enlarged portion 42 of the rod 38 receives a sleeve-like piston 43 made of insulating material. The piston 43 is centered in recess 35 and held in application on head 44 of rod 38 by means of one end of a compression spring 45. The other end of spring 45 engages plug 37 to allow adjustment of the pressure of the spring. The end of rod 38 receives an electric conductor 46 that is electrically insulated with reference to plug 37.

As shown in FIGS. 1 and 2, the pressure-variation sensor 8 functions as follows: the air pressure of the monitored tire is applied to membrane 29 which normally thrusts head 44 of rod 38 beyond contact with gasket 34, which is normally connected to ground. When the pressure goes below a lower threshold, head 44 comes into contact with gasket 34 and closes the warning circuit. When the pressure increases, membrane 29 pushes head 44, compressing adjusting spring 45 until spring 41 comes into contact with piece 37 and is then electrically connected to ground, which also has the effect of closing the general warning circuit.

FIG. 3 shows example of a pressure-variation sensor with lower and upper reference thresholds. it comprises an end piece 47 which is similar to the end portion of the socket 21 of the previous embodiment and therefore will not be described in any further detail. The air pressure of the monitored tire is applied through the hole 28 and against a membrane 29 which is tightly held against a shoulder 48 of a sleeve 49 screwed onto piece 47 after interposition of an intermediate metallic gasket 50. Sleeve 49 has a recess 51 in which slides a piston 52 that defines a seat which receives a pressure adjusting spring 54. The spring 54 is applied against a threaded plug 55 which is screwed to the end of sleeve 49 to enable the compression of the spring 54 to be adjusted. Nut 56 locks plug 55 in the adjusted position.

A piston 52 is disposed in sleeve 49 and has a constriction 57 of a predetermined width, to define a maximum regulating stroke. Two metallic conductor rods 58 and 59 extend through the sleeve 49 and into the constriction 57 and define a lower pressure threshold and an upper pressure threshold, respectively. The rods 58 and 59 are held in an insulating bolt 60 locked in place by a nut 61.

In operation of the sensor of FIG. 3, when the pressure becomes abnormally low, since piston 52 is electrically connected to the vehicle frame and thrust by spring 54, it moves to the left until it comes into contact with rod 59, which closes the low pressure warning circuit by means of a conductor 62. When the pressure becomes abnormally high, piston 52 moves to the right and comes into contact with rod 58 and closes the high-pressure warning circuit.

FIG. 4 shows an example of regulation of the high pressure and low pressure thresholds of the sensor of FIG. 3 by slightly turning bolt 60 to vary the possible stroke of piston 52 between a maximum 64 and a minimum 65.

FIG. 5 schematically shows a variant of a pressure-variation sensor, made with the use of a Bourdon tube 66 whose functioning is well-known, on which the tire pressure is applied. It is connected electrically to ground, and when the pressure drops it closes contact 67 of the low-pressure warning circuit. When the pressure increases beyond the reference threshold, it closes contact 68 of the high-pressure warning circuit.

In the block diagram of FIG. 6, a plurality of modulated signal generators RO1 to ROn are provided corresponding in number to the number of tires to be monitored. Each circuit comprises, for example, a pressure-variation sensor CP, modulators M1 and M2 and warning signal generator G. A single signal generator can be used to advise that one of the tires is in an alarm condition, or a modulator can be used along with a signal generator to advise that one of the tires is in an alarm condition and to indicate whether the pressure is above or below an acceptable pressure range. This signal is sensed by a signal detector or demodulator DS providing an output to a plurality of tuned frequency responsive circuits CI, discriminating the source of the warning signal. Each circuit CI activates a respective relay RE which energizes a respective lamp. The relays also activate a common beep circuit BB which applies a signal to an average-power amplifier AM, driving a loud speaker HP.

FIG. 7 shows a schematic circuit for an illustrative alarm signal generator RO1 including a crystal oscillator delivering a carrier frequency of, for example, 27 MHz. The output transmission circuit includes a coil $L_1$, for example, with 15 turns of 8 to 10 mm enamelled copper wire with contiguous turns on a ferrite metal core that is electrically connected to the vehicle frame via the wheel. A transistor T1 has its emitter biased by two series-connected resistors R1 and R2, with a total of 1.2 Kr resistance, and decoupled by a 47 Pf capacitor C1. The base of the transistor T1 is biased by a bridge of resistors R3 and R4 having 47 Kr and 22 Kr resistances, respectively, and receives the "hot" end Fc of quartz crystal Q whose "cold" end Ff is grounded. The collector is charged by a tuned circuit consisting of the induction coil $L_1$ and an adjustable capacitor $C_2$, 6 to 60 Pf. To sustain oscillation, it is necessary to feed back in phase part of the carrier signal available on the collector via the adjustable capacitor C3, 3 to 30 Pf. The modulation signal is applied across a 0.1 Pf capacitor C4 at the junction of resistors R1 and R2, having 1 Kr and 20 ohm resistances, respectively. The positive pole of dry cell battery P1 is decoupled and filtered by a cell with two capacitors, C5, 50 uf and C6, 0.1 uf. The transmitter is energized by the pressure-variation sensor CP.

The modulator in RO1 is a fixed frequency 50 KHz phase shift oscillator using an NPN transistor T2 whose emitter is grounded with the collector connected to the positive pole of the battery via a resistor R5. The output of the modulator is taken from the collector of transistor T2 and passed to the decoupling capacitor C4. The base of the transistor T2 is biased by a resistor bridge R6 and R7 having 150 Kr and 22 Kr resistances, respectively, connected across the battery. The signal on the collector is fed back to the base via a plurality of RC cells comprising capacitors C7 and C10 and resistors R7 to R10, which ensures the necessary phase shift to allow regenerative operation. The resonance frequency, in the present case 50 KHz, depends upon the RC values in a well-known manner. This 50 KHz signal modulates the 27 MHz carrier frequency established by the quartz Q.

The remote demodulator or receiver DS, as shown in FIG. 7, comprises a pick-up coil $L_2$ wound on a ferrite metal core connected to the vehicle frame and connected to a circuit, including transistor T3, tuned to 27MHz frequency, for example. The transistors T4 and T5 amplify the detected signal and apply it to the base of the transistor T6 which is used as a frequency selector, exemplifying the frequency responsive circuit CI1 of FIG. 6. The filter is a parallel LC circuit in a standard ferrite pot P that resonates at the fixed modulation frequency 50 KHz. The circuit CI2, as shown in FIG. 7, is functionally identical to circuit CI1 but is tuned to respond to a different frequency from a corresponding generator RO2 (not shown).

In the event of an alarm, the beep modulator BB, as shown in FIG. 7 is energized by the relay RE. The modulator BB has two multivibrators MV1 and MV2. The multivibrator MV1 delivers a rectangular signal with an audible frequency of 1 KHz, which is activated by the unblocking of transistor T11 mounted in the return path of the two transistors T7 and T8 to ground. The transistor T11 is itself commanded by the slow multivibrator MV2 that delivers a low frequency 1 Hz rectangular signal which alternately blocks and unblocks transistor T11, which, in turn, governs the 1 KHz oscillator. This results in an output beep signal analogous to an alarm. This signal across capacitor C11 is applied to the first stage of a conventional amplifier circuit AM, delivering a power, for instance, of 1 W to speaker HP.

Each wheel to be monitored has one or two modulator circuits (corresponding to M1 and M2 of FIG. 6) depending on whether it is a general or a specific alarm that is to be delivered, i.e., high or low pressure. The circuit RO1 of FIG. 7 has only one modulator circuit. A second modulator would be introduced in a parallel fashion to modulate the same carrier signal. The circuits are placed inside the casing of FIG. 1, on printed circuit board 16. For each wheel, one frequency responsive circuit, e.g., CI1, or two frequency responsive circuits, e.g., CI1 and CI2, are employed, depending on whether the alarm is to be simply by wheel or by specification of whether the pressure is above or below the acceptable range. The circuit RO to each wheel preferably uses the same carrier frequency.

An oscillator functioning at the indicated frequency, with a power of 5 mW, for instance, without an antenna, but having an induction coil, does not affect a standard radio receiver at a distance of 0.5 m (with superreactor or superheterodyne and standard input induction coil). The two coils $L_1$ and $L_2$, surround ferrite metal cores connected electrically to the vehicle frame, and transmission of the warning signal is effected through the frame in an entirely satisfactory way. Consequently, it is possible to use an oscillator with power on the order of 5 mW with negligible radiation, in accord with customary national regulations on radio transmission, without requiring any specific authorization. If two vehicles equipped according to the invention are placed side-by-side, the functioning of an oscillator does not act on the detector of the neighboring vehicle, even if tuning frequency is the same.

FIG. 8 illustrates an alternate scheme for a pressure-variation sensor associated with each wheel, which transmits the warning signal by means of electrical conductors instead of induction. This system comprises a pressure-variation sensor 69, contacts 70 and 71, a rotating electrical junction 72 allowing transmission of the signals to the dashboard lamps or signal lights 73 by means of conductors 74 and 75, energized by a battery 76.

Of course, other variations of the specific construction and arrangement of the device disclosed above can be made by those skilled in the art without departing from the invention as defined in the appended claims.

I claim:

1. A device for providing a warning signal when the inflation pressure of a respective vehicle tire mounted on a metallic frame falls out of a predetermined range, comprising a plurality of signalling circuits each adapted to be mounted to a respective wheel to which an inflated tire is mounted, each signalling circuit including a tire pressure sensor adapted to be mounted to the wheel and generate an output signal, oscillating circuit means adapted to be mounted to the wheel responsive to the output signal of said sensor for producing an oscillating signal in the form of a wave, and means for inductively transmitting said oscillating signal via the respective wheel to said metallic frame, the oscillating signal produced by each oscillating circuit means being at a different predetermined frequency; pick-up means including a plurality of tuned receiver means adapted to be mounted on the frame for detecting respectively the oscillating signals produced by each of said oscillating circuit means and generate an output signal responsive thereto; and a plurality of indicator means adapted to be mounted in the vehicle responsive to the output signal of said pick-up means for indicating tire pressure conditions in the respective tires.

2. The device of claim 1 wherein each said sensor means includes means for producing a first signal indicating that the pressure is above an acceptable range and a second signal indicating that the pressure is below an acceptable range, each of said oscillating circuit means including means for producing a corresponding fixed frequency oscillating signal at different first and second fixed frequencies corresponding to said first and second signals from said sensor means, said pick-up means including tuned receivers corresponding to each of said first and second fixed frequencies produced by each of said circuit means, said indicator means including means for indicating which tire has an unacceptable inflation pressure and whether said inflation pressure is above or below the acceptable range.

3. The device of claim 1 wherein each said signalling circuit includes means for producing a carrier frequency signal, and means for modulating said carrier frequency signal with said oscillating signal.

4. The device of claim 3 wherein the carrier frequency signals produced by said signalling circuits are at the same frequency.

5. An alarm system for providing a signal when the inflation pressure of an inflated tire mounted on a metallic vehicle frame falls out of a predetermined range, comprising:
    signal generating means for sensing and emitting a signal in the form of a wave when the inflation pressure falls above or below a predetermined range,
    said signal generating means including a source of D.C. power,
    transmission means for transmitting the signal to said metallic frame,
    receiving means for receiving the signal from the frame, and
    converting means for converting the signal into a discernable alarm.

6. The system of claim 5, wherein a plurality of inflated tires are provided, and further including a separate signal generating means associated with each tire.

7. The system in claim 6, wherein the signal generating means for each tire emits a signal at a frequency different from that for the other tires, said receiving means including means for distinguishing among the different frequencies, said converting means providing a different discernable alarm for each frequency.

8. The system in claim 5, wherein the signal generating means includes means for emitting a different signal depending on whether the tire has too much pressure or insufficient pressure.

9. The system in claim 8, wherein the different signals have different frequencies.

10. The system in claim 5, wherein the receiving means includes an induction coil in contact with the frame.

11. The system in claim 5, wherein the signal generating means includes adjustment means for varying the range above and below which the inflation pressure is sensed and the signal emitted.

12. The system in claim 11, wherein the adjustment means includes a housing, two conductive pins projecting into the housing into the path of a piston, said piston being adapted to move in the housing in response to pressure changes in the tire, one of the pins positioned to contact the piston when the tire is overinflated and the other pin positioned to contact the piston when the tire is underinflated, means for moving the pins relative to the piston for varying said range.

* * * * *

UNITED STATES PATENT AND TRADEMARK OFFICE
CERTIFICATE OF CORRECTION

PATENT NO. : 4,090,172
DATED : May 16, 1978
INVENTOR(S) : Borislav Vesnic

It is certified that error appears in the above-identified patent and that said Letters Patent are hereby corrected as shown below:

In the Abstract, line 15, before "severally" insert -- selectors --.

Column 3, line 20, change "it" to -- It --.

Signed and Sealed this

Thirtieth Day of January 1979

[SEAL]

Attest:

RUTH C. MASON
Attesting Officer

DONALD W. BANNER
Commissioner of Patents and Trademarks